United States Patent [19]

Boon

[11] Patent Number: 5,570,197
[45] Date of Patent: Oct. 29, 1996

[54] APPARATUS FOR FURTHER COMPRESSING AND RECORDING ENCODED DIGITAL VIDEO DATA STREAMS

[75] Inventor: Choong S. Boon, Moriguchi, Japan

[73] Assignee: Matsushita Electric Industrial Co., Ltd., Osaka, Japan

[21] Appl. No.: 252,173

[22] Filed: Jun. 1, 1994

[30] Foreign Application Priority Data

Jun. 1, 1993 [JP] Japan .................................... 5-130840

[51] Int. Cl.$^6$ ................................ H04N 5/76; H04N 7/12
[52] U.S. Cl. .......................... 386/46; 348/390; 348/405; 348/409; 348/422; 348/423; 382/246; 382/248; 341/67
[58] Field of Search ..................... 358/335, 310; 348/384, 390, 403, 404, 405, 408, 409, 410, 411, 412, 420, 423; 382/244, 245, 246, 248, 232; 341/67; H04N 5/76, 7/12, 7/50

[56] References Cited

U.S. PATENT DOCUMENTS

| | | | |
|---|---|---|---|
| 3,921,132 | 11/1975 | Baldwin | 360/33.1 |
| 4,142,209 | 2/1979 | Hedlund et al. | 360/77 |
| 4,277,807 | 7/1981 | Baldwin | 360/32 |
| 4,468,710 | 8/1984 | Hashimoto et al. | 360/33.1 |
| 4,903,317 | 2/1990 | Nishihara et al. | 382/248 |
| 5,225,904 | 7/1993 | Gollin et al. | 348/410 |
| 5,321,440 | 6/1994 | Yanagihara et al. | 348/408 |

FOREIGN PATENT DOCUMENTS

| | | |
|---|---|---|
| 0545711 | 6/1993 | European Pat. Off. . |
| 4014744 | 11/1990 | Germany . |

OTHER PUBLICATIONS

SMPTE Journal, vol. 101, No. 7, Jul. 1992, pp. 466–470, Reitmeyer et al., "The Digital Hierarchy—A Blueprint for Television in the 21st Century".

NASA Tech Briefs, Dec. 1989, p. 1009, Watson, "Ideal Resampling of Discrete Sequence".

"Flexibly Scalable Digital Video Coding", Signal Processing: Image Communication 5 (1993) 5–20, 1993.

"The MPEG Video Compression Algorithm", Signal Processing: Image Communication 4 (1992) 129–140.

"Subband Based TV Coding", Signal Processing: Image Communication 5 (1993) 105–118, 1993.

"Algorithms for Manipulating Compressed Images", IEEE Computer Graphics & Applications, 1993.

*Primary Examiner*—Thai Tran
*Attorney, Agent, or Firm*—Wenderoth, Lind & Ponack

[57] ABSTRACT

An encoded video data re-compressing apparatus further compresses, for further transmission or storage, an encoded video data stream that includes quantization parameters and quantized coefficients without having to decompress the encoded video data streams and subsequently re-compress the decompressed video data. The encoded video data stream is parsed for extracting the quantization parameters and quantized coefficients from other side information. The quantized coefficients are either divided by a predetermined integer or selectively discarded to reduce the total number of bits. In the former case, the corresponding quantization parameters are multiplied by a predetermined integer. The manipulated coefficients and quantization parameters are multiplexed with the side information, such that they occupy the location of the corresponding original coefficients and quantization parameters in the video data stream. Equipped with a digital data recorder and a set of switches, the encoded digital video data stream could be recorded in either its original form (a normal recording mode) or a more compact form (a long recording mode) by dividing the quantized coefficients by a predetermined integer or selectively discarding some of the coefficients.

4 Claims, 7 Drawing Sheets

APPARATUS FOR FURTHER COMPRESSING AND RECORDING ENCODED DIGITAL VIDEO DATA STREAMS

BACKGROUND OF THE INVENTION

1. Field of the Invention

The present invention relates to an apparatus for further compressing encoded digital video data streams for transmission and storage, and more particularly to a recording apparatus that is capable of recording an encoded digital video data stream in either its original form or a more compact form.

2. Description of the Prior Art

Numerous video bit-rate reduction coding schemes are known for compressing digitized video signals for transmission and storage at a reduced bit rate. Activities for developing these techniques are widely under progress. International standards have been created, while some are still under development, by organizations such as the ITU and ISO.

The motion-compensated transform coding algorithm is currently the most widely used method and has been adopted as the key technique by major international standards such as H. 261, MPEG1 and MPEG2 for compressing digital video sequences. A wide variety of literature on this coding method is available, an example of which is published in "The MPEG Video Compression Algorithm", Signal Processing, Image Communication, Vol. 4 No. 2, April 1992, pp. 129–140. Briefly, the algorithm works in the following manner. A current picture is divided into adjacent blocks, each containing a matrix of pixel data. For each block, a motion vector is detected by comparing the current block to a reference picture to find the best-matched prediction among possible blocks in the reference picture. The difference between the predicted block and the current block, i.e., the prediction error, is further compressed using an orthogonal transformation to remove spatial correlation. The transformed coefficients are quantized by a quantization parameter to discard the less important information. Finally, the motion vectors and quantization parameters are combined with the quantized coefficients and other side information for transmission or storage using fixed or variable length codes.

Another popular method for image compression is the subband/wavelet coding scheme, where an image is divided into a plurality of bands by using bandpass filters and each band is quantized and coded with a coder specifically adapted to it. In a fashion similar to the transform coding scheme, temporal redundancy is reduced by motion compensation. Motion-compensated prediction subbands are subtracted from the subbands of the original picture. The subband prediction errors are quantized by a quantization parameter and coded, together with the quantization parameters, motion vectors and other side information, before transmission or storage. An example of the subband coding scheme could be found in "Subband based TV coding", Signal Processing, Image Communication, Vol. 5, Nos. 1–2, February, 1993, pp. 105–118.

In both the image coding schemes described above and in other schemes, the encoded digital video data streams are in binary ("0" or "1") form. The total amount of "0"s and "1"s in the data streams per second, i.e., the bit rate, determines the bandwidth of the transmission channel or the volume needed in the storage medium for recording the data streams. In other words, a digital video sequence has to be compressed to a bit rate that is suitable for transmission through a particular channel or storage in a particular storage medium. A typical 74-minute compact disk, for example, can only store a 74-minute program if the bit rate of the data stream (including audio and system information) is 1.4 Mbps. In the MPEG1 international standard, video sequences are compressed to 1.15 Mbps, which is $\frac{1}{140}$ of the original.

On the other hand, there are demands for recording more programs in a storage medium than in the normal recording mode. Most of the conventional analog video cassette recorders (VCR) are capable of multispeed operation which allows two or three tape speeds for longer recording/playing time, while sacrificing some quality of the transmitted video signal. For example, VHS recorders usually have 2-, 4-, and 6-hour playing times for the standard length T120 tape cassette. The corresponding tape speeds are 33.35, 16.67 and 11.12 mm/s, respectively. The servo system has provisions for changing the speed in accordance with a front-panel selector switch for the record mode of operation. For digital data streams, however, a longer recording time cannot be achieved by lowering the speed of the storage medium since the transmission rate of the data stream is constant. Lowering the speed of a writable compact disk below the normal recording speed, for example, would lead to imperfect recording of all the "0"s and "1"s of the received data streams. For a longer recording time capability, the encoded data streams have to be further compressed to a lower bit rate prior to recording. Another demand arises when the encoded digital programs are to be transferred or distributed to channels having a narrower bandwidth. A data stream that is encoded to 9 Mbps, for example, has to be further compressed to enable transmission through a 4 Mbps transmission channel.

Further compression of an encoded data stream could be achieved by first decompressing and reconstructing the encoded data stream, followed by the compression of the reconstructed sequences to a desired bit rate. This requires the apparatus to be equipped with a full decoder and a full encoder. Besides, both the decompressing and compressing processes will incur a long delay before the received data stream could be recorded or distributed. One of the techniques for manipulating compressed images can be found in "Algorithms for Manipulating Compressed Images," IEEE Computer Graphics & Applications, September 1993, pp. 34–42, which claims that image manipulation operations are performed 50 to 100 times faster without decorepressing and subsequently compressing the encoded data stream.

SUMMARY OF THE INVENTION

An object of the present invention is to provide an apparatus for further compressing, for transmission and storage, encoded video data streams without having to decompress the encoded video data streams and subsequently re-compress the decompressed video data.

Another object of the present invention is to provide a recording apparatus that is capable of recording an encoded digital video data stream in either its original form or a more compact form, without having to decompress the encoded video data streams and subsequently re-compress the decompressed video data.

According to the present invention, an encoded video data stream that includes quantization parameters and quantized coefficients is received and parsed for extracting the quantization parameters and quantized coefficients. The quantized coefficients are either divided by a predetermined integer or selectively discarded to reduce the total number of bits. In the former case, the corresponding quantization parameters have to be multiplied by the predetermined integer. In this manner, the encoded video data streams need not be decompressed and subsequently recompressed and hence are free from a substantial amount of delay. A full decoder and a full encoder are also unnecessary.

More specifically, a preferred embodiment of the present invention comprises a variable length decoder, a requantizer, a variable length encoder and a multiplexer for further compressing encoded video data streams which include first quantization parameters and first quantized coefficients. The variable length decoder parses the video data streams, and then distinguishes and extracts the first quantization parameters and the first quantized coefficients from other side information. The requantizer, coupled to the variable length decoder, manipulates the first quantization parameters and the first quantized coefficients based on a predetermined non-zero integer M, such that the first quantization parameters are multiplied by M to produce second quantization parameters, while the first quantized coefficients are divided by M to produce second quantized coefficients. The variable length encoder, coupled to the requantizer, converts the second quantization parameters and the second quantized coefficients to a set of variable length codes. The multiplexer, coupled to the variable length decoder and the variable length encoder, merges the variable length codes into the side information, such that the second quantization parameters and the second quantized coefficients respectively replace the first quantization parameters and the first quantized coefficients in the video data stream.

A second preferred embodiment of the present invention comprises an input device, a storage device, a variable length decoder, a requantizer, a variable length encoder, and a multiplexer for recording encoded video data streams which include first quantization parameters and first quantized coefficients. The video data streams are input to the input device. The storage device is coupled to the input device during a normal recording mode and records the video data stream on a digital storage medium. The variable length decoder is coupled to the input device during a long recording mode. It parses the video data streams, and then distinguishes and extracts the first quantization parameters and the first quantized coefficients from other side information. The requantizer, coupled to the variable length decoder, manipulates the first quantization parameters and the first quantized coefficients based on a predetermined non-zero integer M, such that the first quantization parameters are multiplied by M to produce second quantization parameters, while the first quantized coefficients are divided by M to produce second quantized coefficients. The variable length encoder, coupled to the requantizer, converts the second quantization parameters and the second quantized coefficients to a set of variable length codes. The multiplexer, coupled to the variable length decoder and the variable length encoder, merges the variable length codes into the side information, such that the second quantization parameters and the second quantized coefficients respectively replace the first quantization parameters and the first quantized coefficients in the video data stream, and outputs a new video data stream to the storage device for recording on the digital storage medium during the long recording mode.

A third preferred embodiment of the present invention comprises a variable length decoder, a selector, a variable length encoder and a multiplexer for further compressing encoded video data streams which include a plurality of blocks each containing K quantized orthogonal transformed coefficients. The variable length decoder parses the video data streams, and then distinguishes and extracts the quantized orthogonal transformed coefficients from other side information. The selector, coupled to the variable length decoder, extracts, for each block, k quantized orthogonal transformed coefficients where (k<K). The variable length encoder, coupled to the selector, converts the selected k quantized orthogonal transformed coefficients into a set of variable length codes. The multiplexer, coupled to the variable length encoder and the variable length decoder, merges the variable length codes of the selected k quantized orthogonal transformed coefficients into the side information, such that the selected k quantized coefficients replace the corresponding blocks in the video data stream.

A fourth preferred embodiment of the present invention comprises an input device, a storage device, a variable length decoder, a selector, a variable length encoder and a multiplexer for recording encoded video data streams which include a plurality of blocks each containing K quantized orthogonal transformed coefficients. The video data streams are input to the input device. The storage device is coupled to the input device during a normal recording mode and records the video data stream on a digital storage medium. The variable length decoder is coupled to the input device during a long recording mode. It parses the video data streams, and then distinguishes and extracts the quantized orthogonal transformed coefficients from other side information. The selector, coupled to the variable length decoder, extracts, for each block, k quantized orthogonal transformed coefficients where (k<K). The variable length encoder, coupled to the selector, converts the selected k quantized orthogonal transformed coefficients into a set of variable length codes. The multiplexer, coupled to the variable length encoder and the variable length decoder, merges the variable length codes of the selected k quantized orthogonal transformed coefficients into the side information, such that the selected k quantized coefficients replace the corresponding blocks in the video data stream, and outputs a new video data stream to the storage device for recording on the digital storage medium during the long recording mode.

In a preferred manner, the selected k quantized orthogonal transformed coefficients includes the DC component (frequency=0) and (k–1) low-frequency components concentrated around the DC component.

DESCRIPTION OF THE PREFERRED EMBODIMENTS

Figure 1:
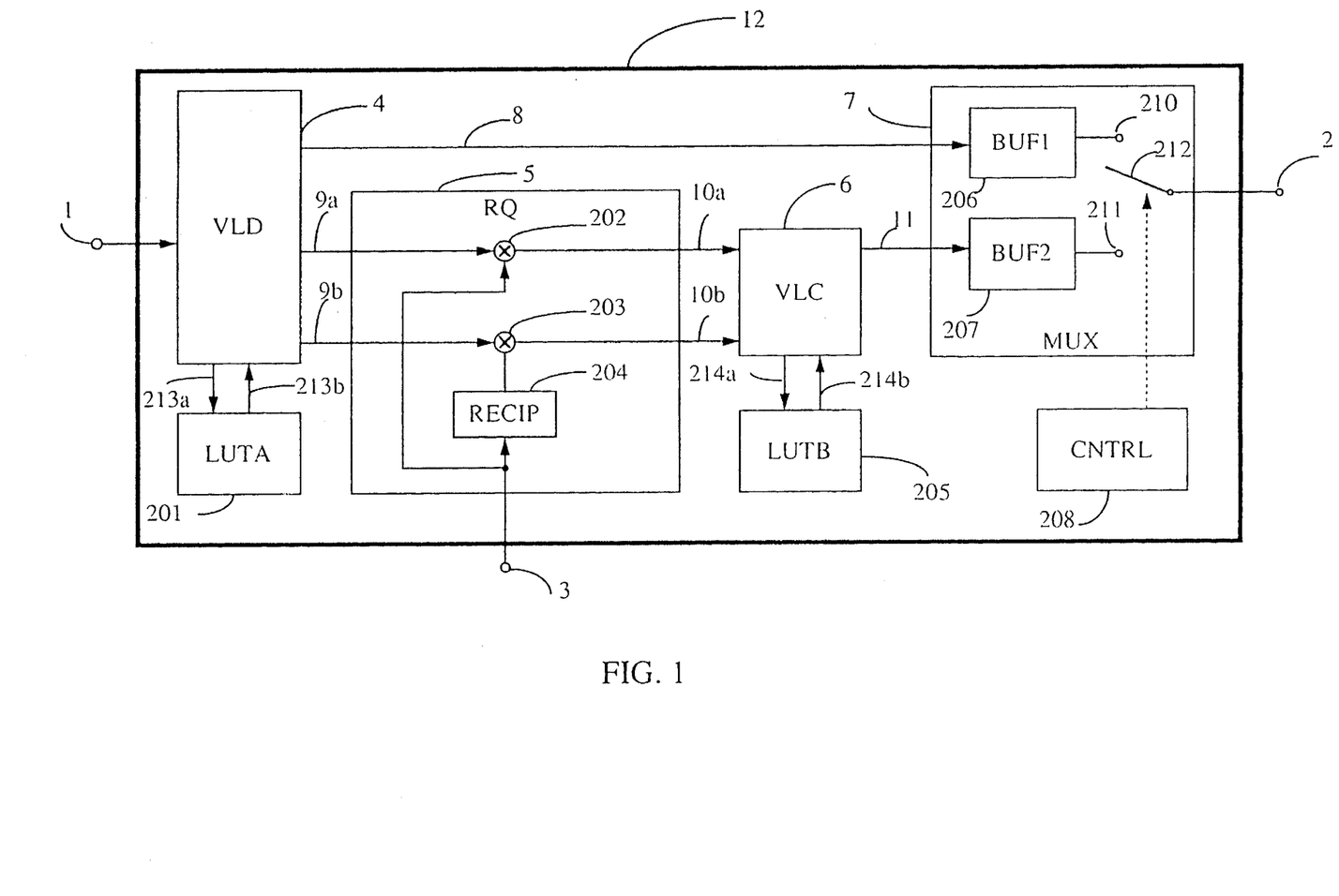
FIG. 1 is a block diagram of an embodiment of an apparatus for further compressing encoded digital video data streams in accordance with the present invention.

FIG. 1 is a block diagram of an embodiment of an apparatus for further compressing encoded digital video data streams in accordance with the present invention.

Encoded digital video data streams, in a binary ("0"s or "1"s) form, are input at port 1. An encoded digital video data stream usually comprises quantized coefficients, quantization parameters, motion vectors for motion compensation (when adopted) and side information which includes frame size, frame rate, pel aspect ratio, and synchronization data for indication of the start of a sequence, an image or a subimage. Encoded digital video data streams will hereafter be referred to as "bitstreams".

Figure 2:
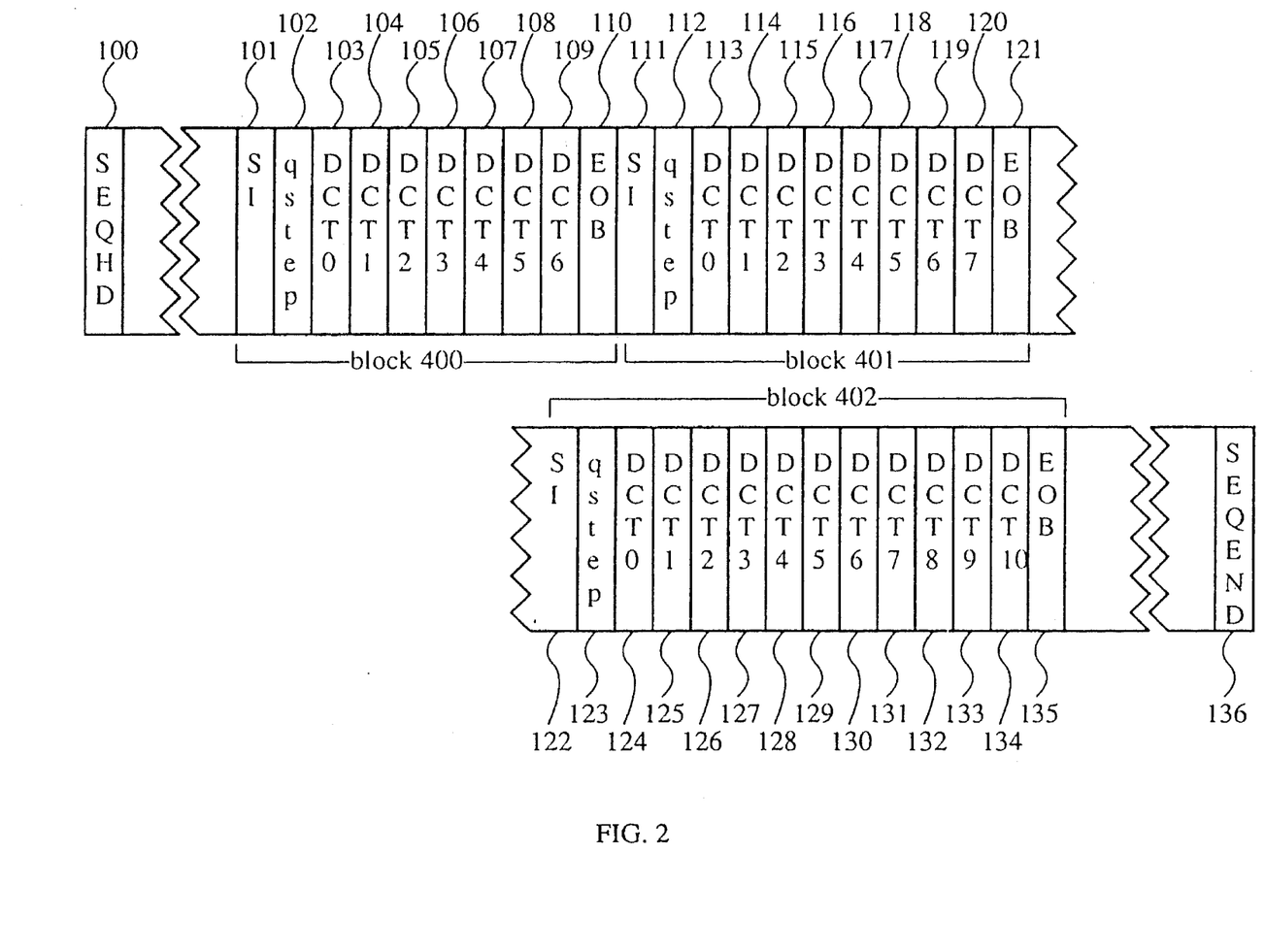
FIG. 2 illustrates an example of a portion of an encoded digital video data stream.

An example of a bitstream obtained from a transform coder is illustrated in FIG. 2. The bitstream begins with a sequence header (SEQHD) 100, indicating the start of a new sequence of images or program. A sequence header also includes frame size, frame rate, pel aspect ratio and other information that governs the whole sequence. A sequence header is typically followed by a picture header, indicating the start of a new image (not shown in the figure). A picture header also contains the information that governs the corresponding image. In a transform coder, an image is divided into adjacent blocks, each containing a matrix of pixel data. Each block or its prediction error is transformed through an orthogonal transformation such as a discrete cosine transform, a HADAMARD transform or a HAAR transform. The transformed coefficients are then quantized with a predetermined quantization parameter. Thereafter, in the bitstream, following the picture header, comes the indication of the start of a block, its location, type (predicted or original), motion vectors (if adopted) and other information that governs the block. All these are represented as SI 101 in FIG. 2. After these are the quantization parameter (qstep) 102 and the quantized coefficients (DCT0-6) 103–109. As an indication of the end of the block, a signal, EOB 110 is appended, as the number of coefficients per block is different. These data are repeated for all the blocks in all the images of the sequence. Finally, a signal, SEQEND 136, indicates the end of the sequence. All these data are usually coded as fixed or variable length codes. The H. 261, MPEG1 and MPEG2 international standards define the syntax of the bitstreams.

Figure 3:
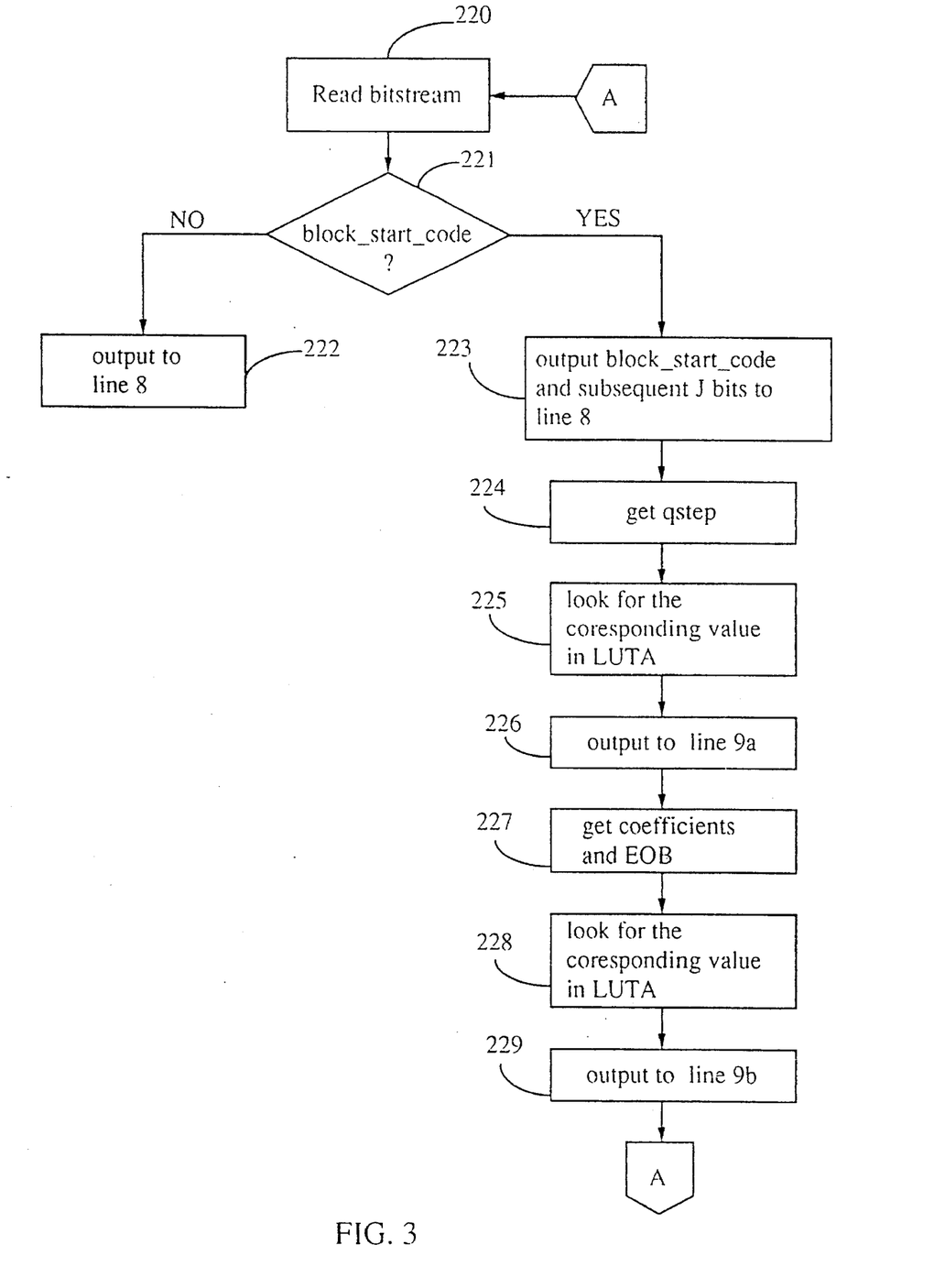
FIG. 3 is a flow chart showing an operation of the variable length decoder in FIG. 1.

A variable length decoder (VLD) 4 parses the input bitstream for distinguishing and extracting quantization parameters and quantized coefficients from the other side information. In a preferred manner, the VLD 4 is implemented by programmable digital signal processor (DSP) whose operation is shown in FIG. 3. First, the VLD 4 searches for block_start_code, the start-code of each block (step 221). The block_start_code is usually a unique fixed code. The data precede the block_start_code are left untouched and transferred via line 8 (step 222) to a multiplexer (MUX) 7 of FIG. 1. Upon finding the block_start_code, the VLD 4 outputs the block_start_code and subsequent J bits of data to line 8 (step 223). The J bits of data are represented as SI in FIG. 2. Note the SI does not include the qstep and quantized coefficients. Next, VLD 4 gets the qstep (step 224), converts it from the binary form to numerical value by referring to a look-up table (LUTA) 201 of FIG. 1 (step 225). The numerical value is then outputted via line 9a (step 226). Next, VLD 4 gets the quantized coefficients and EOB (step 227). The quantized coefficients are converted from the binary form to numerical values by referring to LUTA 201 (step 228) and then transferred via line 9b to a re-quantizer (RQ) 5 (step 229). This process is repeated for all the blocks in the bitstream.

Returning to FIG. 1, a re-quantization parameter, M, is input to RQ 5 through port 3. M is a non-zero integer. It could be fixed or variable for different blocks. Based on M, the new quantization parameter, qstep*, and new quantized coefficient, DCTj*, are manipulated in the following manner:

$$qstep^* = qstep \times M,$$

$$DCTj^* = DCTj/M,$$

where qstep is the old quantization parameter and DCTj is the old quantized coefficient. In a preferred manner, the old quantization parameter is transferred to RQ 5 via line 9a, multiplied by M at a multiplier 202 and outputted to VLC 6 via line 10a. The old quantized coefficients are transferred to RQ 5 via line 9b, multiplied by the reciprocal of M at another multiplier 203 and outputted to VLC 6 via line 10b. The reciprocal of M is computed at RECIP 204. M has to be constrained such that qstep* is encodable by the number of bits allocated for the quantization parameters. If a quantization parameter is 5 bits long, for example, M must be constrained such that qstep* is 31 at maximum. At VLC 6, the new quantization parameter and the new quantized coefficients are converted to binary form by referring to a look-up table (LUTB) 205. The new data are then sent to MUX 7 via line 11.

At MUX 7, the new data are combined with the side information received via line 8 such that, the new quantization parameters and new quantized coefficients replace the corresponding old quantization parameters and old quantized coefficients in the bitstream. In a preferred manner, the side information transferred via line 8 is stored in a buffer (BUF1) 206 while the new quantization parameters and new quantized coefficients transferred via line 11 are stored in another buffer (BUF2) 207. A controller (CNTRL) 208 controls a switch 212 for concatenating the data in BUF1 and BUF2. First, switch 212 is connected to port 210 for outputting the data in BUF1 206 to port 2. Next, switch 212 is connected to port 211 for outputting the data in BUF2 207 to port 2. In this manner, qstep 102 of FIG. 2 is replaced by qstep*, and DCTj (j=0, 1, . . . , 6) 103–109 are replaced by DCTj* (j=0, 1, . . . , 6). Similarly, the qstep and DCTj in blocks 201 and 202 are replaced by their respective new versions. The new bitstream thus formed is outputted via port 2 of FIG. 1 for further transmission or storage.

Figure 4:
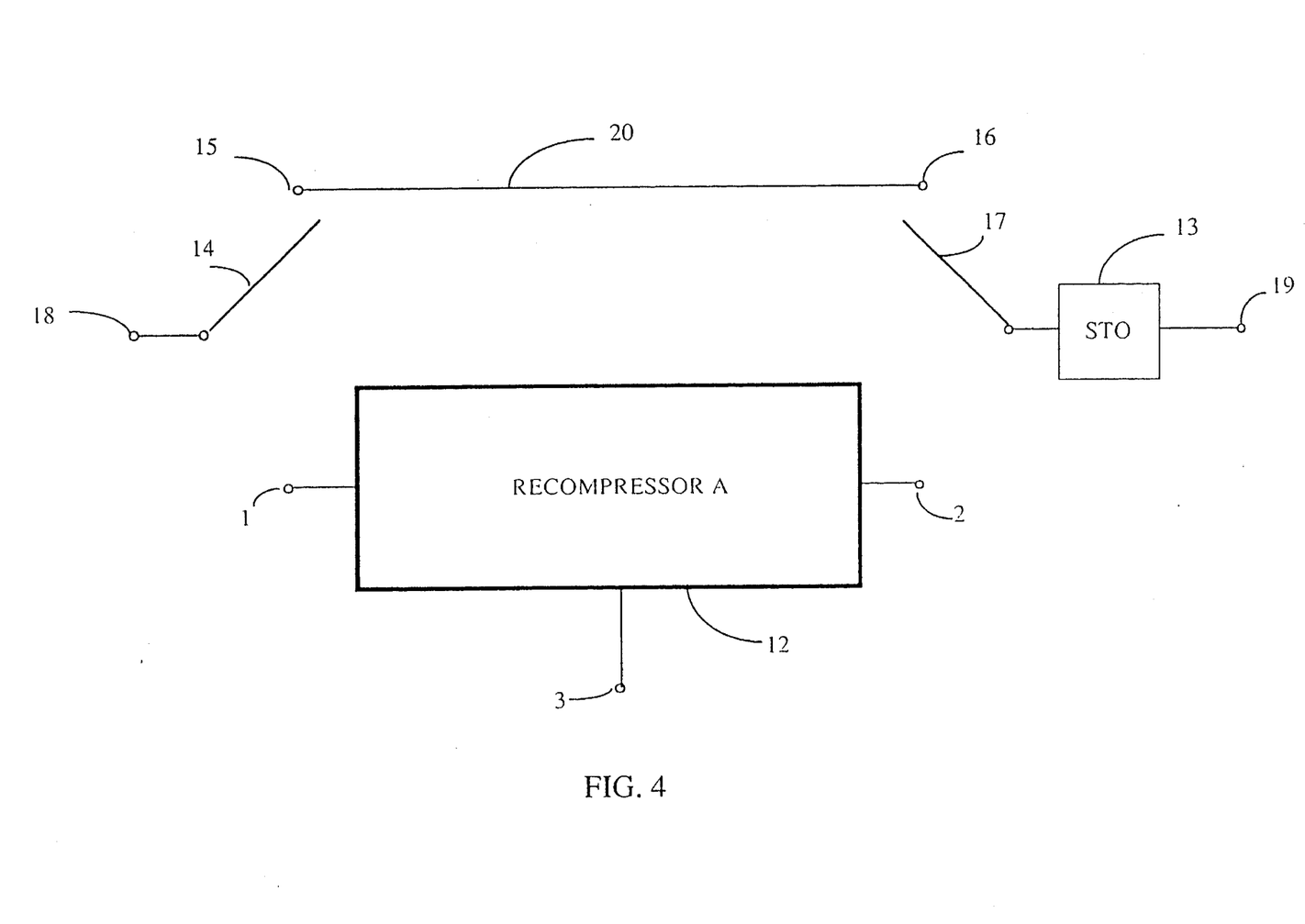
FIG. 4 is a block diagram of an embodiment of an apparatus for recording encoded digital video data streams with normal and long recording modes in accordance with the present invention.

FIG. 4 is a block diagram of an embodiment of an apparatus for recording a bitstream in either its original form or a more compact form in accordance with the present invention.

A received bitstream is input at port 18 which is coupled to a switch 14. Another switch 17 is coupled to a digital data recorder (STO) 13. These two switches are controlled through a front-panel selector switch for the normal or the long recording mode. During the normal recording mode, switch 14 is coupled to port 15 and switch 17 is coupled to port 16. The input bitstream is sent to STO 13 via line 20, and is recorded without any manipulations. Examples of the storage medium are magnetic tapes and optical disks. Examples of these recording systems are disclosed in U.S. Pat. Nos. 3,921,132, 4,142,209, 4,277,807, and 4,468,710. During the long recording mode, switch 14 is coupled to port 1 while switch 17 is coupled to port 2. The input bitstream is processed in RECOMPRESSOR A 12 as described above to produced a new bitstream at a reduced bit rate. The new bitstream is then recorded in STO 13.

Figure 5:
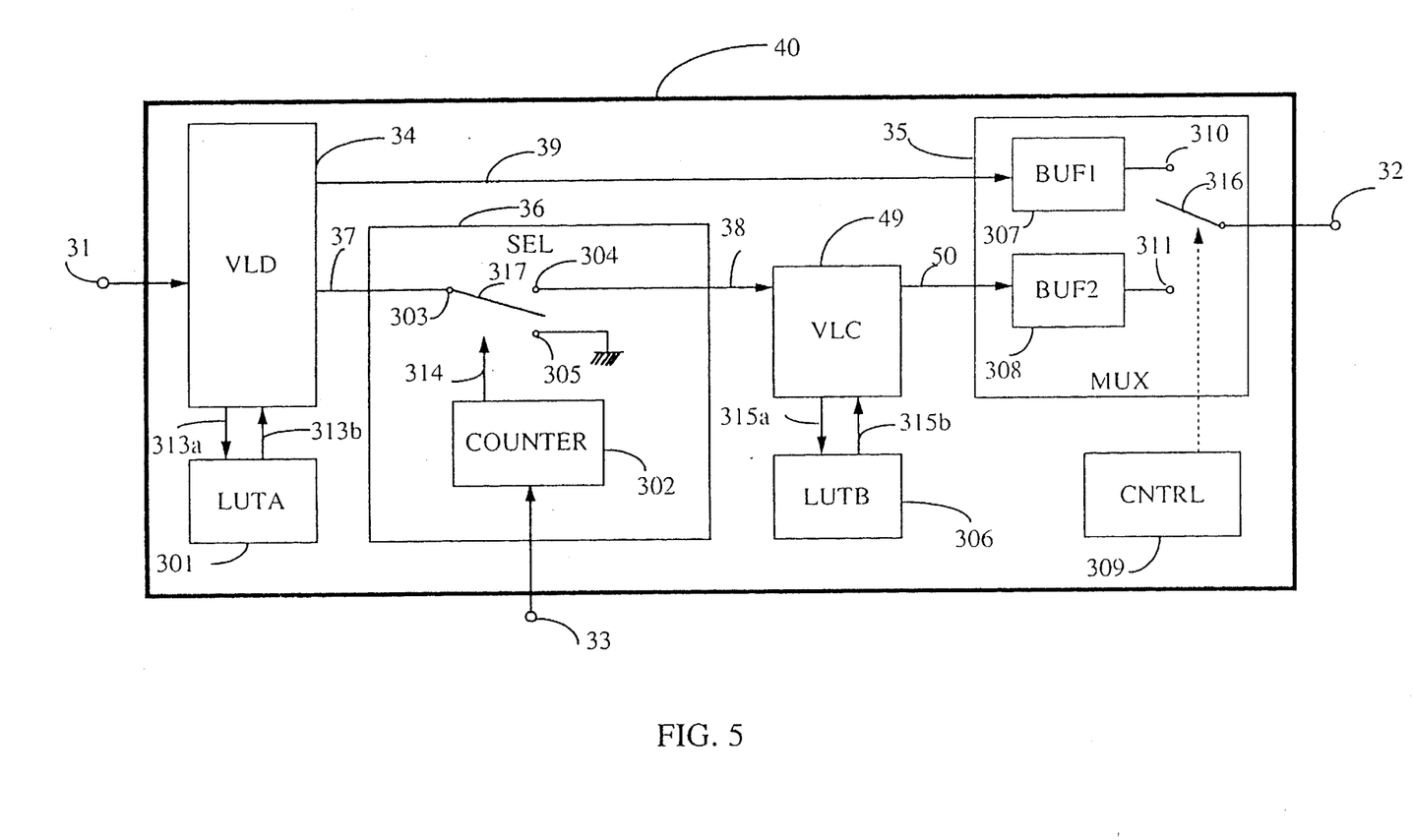
FIG. 5 is a block diagram of another embodiment of an apparatus for further compressing encoded digital video data streams in accordance with the present invention.

According to a variation of the present invention, the quantized coefficients are selectively discarded for reducing the total number of coefficients of a block and thus the total number of bits. A preferred embodiment of such a variation is shown in FIG. 5.

Figure 6:
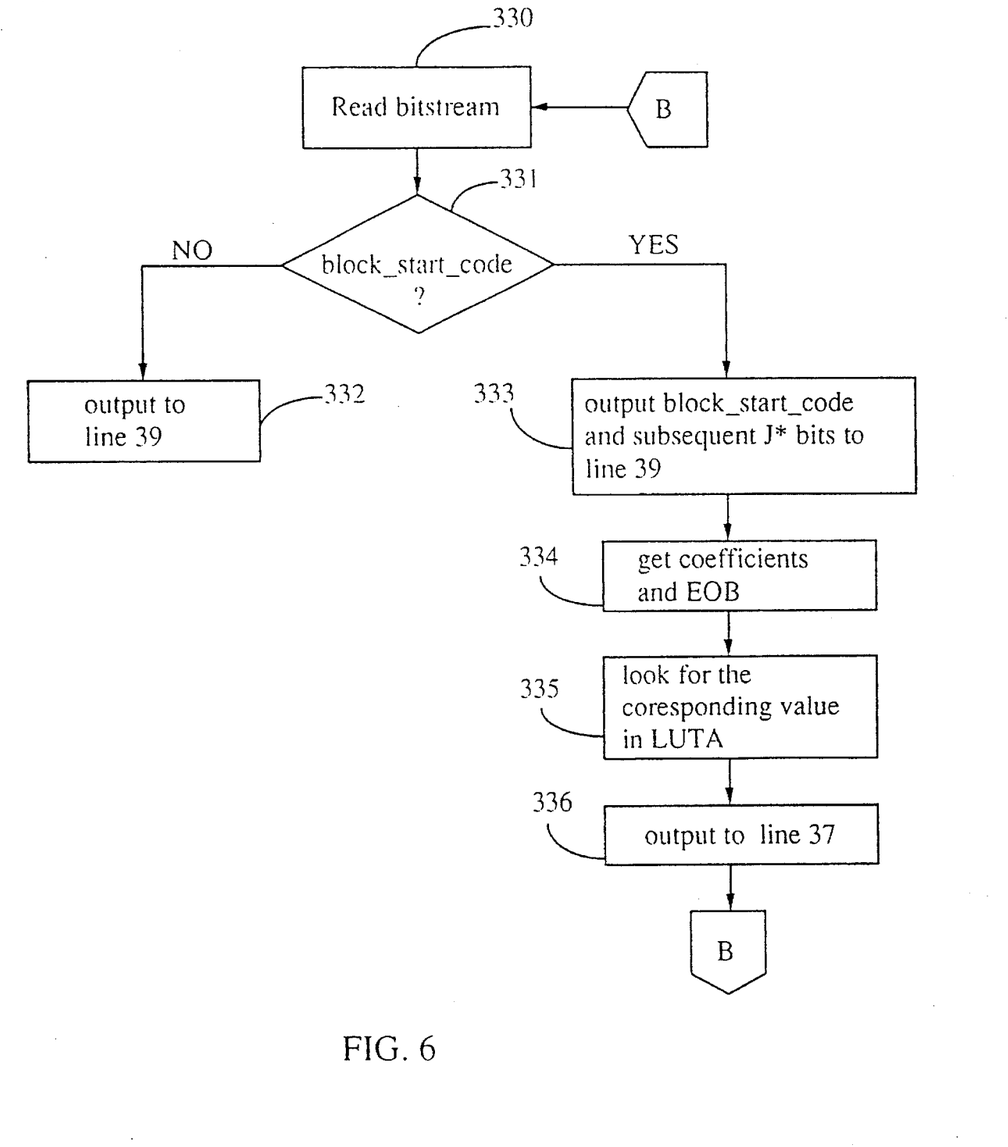
FIG. 6 is a flow chart showing an operation of the variable length decoder in FIG. 5.

A bitstream, as illustrated in FIG. 2, is input at port 31. A VLD 34 parses the bitstream and extracts the quantized coefficients from other side information as described below. In this embodiment, the quantization parameters need not be extracted. The operation of VLD 34 is shown in FIG. 6. First, the VLD 34 searches for block_start_code, the start-code of each block (step 331). The data precede the block_start_code are left untouched and transferred via line 39 (step 332) to a multiplexer (MUX) 35 of FIG. 5. Upon finding the block_start_code, the VLD 34 outputs the block_start_code and subsequent J* bits of data to line 39 (step 333). The J* bits of data include the side information represented as SI in FIG. 2 and the qstep. Next, VLD 34 gets the quantized coefficients and EOB (step 334). The quantized coefficients are converted from the binary form to numerical values by referring to LUTA 301 (step 335) and then transferred via line 37 to a selector (SEL) 36 (step 336). This process is repeated for all the blocks in the bitstream.

Returning to FIG. 5, a selection parameter S is input at port 33 to SEL 36. S is a fixed or variable non-zero integer. It indicates the number of quantized coefficients not to be discarded. In a preferred manner, a counter 302 controls a switch 317 for selectively discarding some coefficients. At the beginning of each block, switch 317 is coupled to port 304 and counter 302 is set to S. The first coefficient of the block is transferred via line 38 to a VLC 49. The counter 302 decreases by one on transferring a coefficient. While the counter 302 has a value larger than zero, the switch 317 is coupled to port 304 for transferring the coefficients via line 38 to VLC 49. When the value in the counter 302 reaches zero, an indication of the end of block is sent via line 38 to VLC 49. At the some time and other cases where the value in the counter 302 is below zero, the switch 317 is coupled to port 305 where the coefficients transferred via line 37 are discarded. In this manner, when S=3 for example, the first three coefficients of block 400 of FIG. 2, i.e., DCT0 (103), DCT1 (104), DCT2 (105), are preserved, while the remaining coefficients (106–109) are discarded. The EOB 110 is appended after DCT2 (105). Similarly, DCT3–DCT7 (116–120) of block 401 and DCT3–DCT10 (127–134) of block 402 are discarded. As the coefficients in a bitstream are typically arranged in the order according to the significance of the components, less significant coefficients which are placed towards the end of a block are discarded as described in the example above. In a preferred manner, the DC component (frequency=0) and the low frequency components adjacent to the DC component are not to be discarded as these components dominate the overall quality of the reconstructed image.

In the VLC 49, the selected coefficients are converted to binary form by referring to a look-up table (LUTB) 306.

The new binary data are sent to MUX 35 via line 50. The new data are combined in MUX 35 with the side information received via line 39 such that, the selected coefficients replace the corresponding blocks in the bitstream as described above. In a preferred manner, the side information transferred via line 39 is stored in a buffer (BUF1) 307 while the selected coefficients transferred via line 50 are stored in another buffer (BUF2) 308. A controller (CNTRL) 309 controls a switch 316 for concatenating the data in B UF1 307 and B UF2 308. First, switch 316 is connected to port 310 for outputting the data in BUF1 307 to port 32. Next, switch 316 is connected to port 311 for outputting the data in B UF2 308 to port 32. The new bitstream thus formed is outputted for further transmission or storage.

Figure 7:
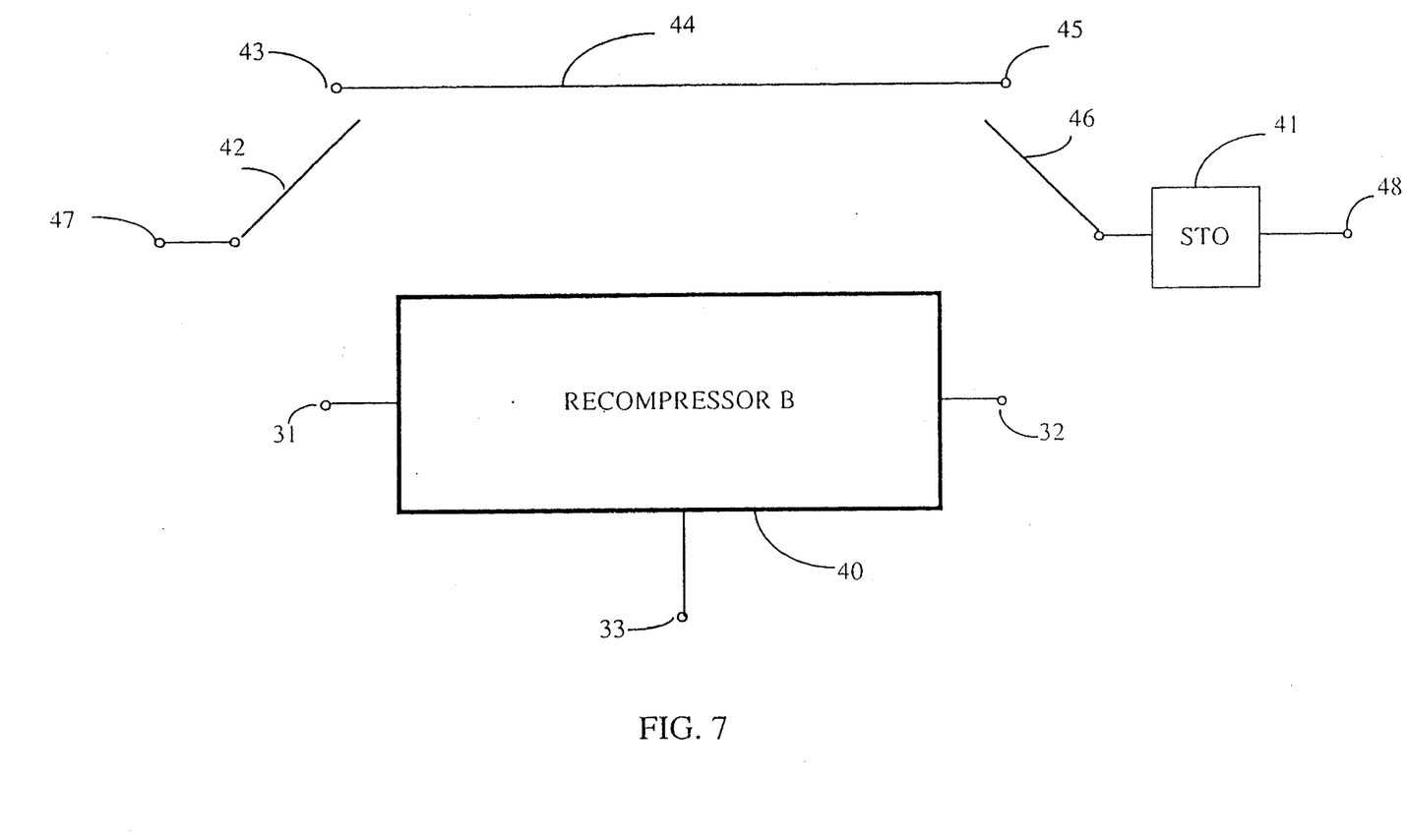
FIG. 7 is a block diagram of another embodiment of an apparatus for recording encoded digital video data streams with normal and long recording modes in accordance with the present invention.

A preferred embodiment of a variation of the present invention for recording a bitstream in either its original form or a more compact form is shown in FIG. 7. A received bitstream is input to port 47 which is coupled to a switch 42. Another switch 46 is coupled to a digital data recorder (STO) 41. These two switches are controlled through a front-panel selector switch for the normal or the long recording mode. During the normal recording mode, switch 42 is coupled to port 43 and switch 46 is coupled to port 45. The input bitstream is sent to STO 41 via line 44, and is recorded without any manipulations. Examples of the storage medium are magnetic tapes and optical disks. During the long recording mode, switch 42 is coupled to port 31 while switch 46 is coupled to port 32. The input bitstream is processed in RECOMPRESSOR B 40 as described above to produced a new bitstream at a reduced bit rate. The new bitstream is then recorded in STO 41.

Although the invention has been described in connection with the above preferred embodiments, those skilled in the art would appreciate that numerous modifications and adaptations may be made thereto without departing from the spirit and scope of the invention as set forth in the appended claims.

What is claimed is:

1. An apparatus for further compressing an encoded video data stream which includes a plurality of blocks each containing K quantized orthogonal transformed coefficients, wherein K is a positive integer, comprising:

a variable length decoder for parsing the video data stream, distinguishing and extracting the quantized orthogonal transformed coefficients from other side information;

a selector coupled to said variable length decoder for extracting, for each said block, k quantized orthogonal transformed coefficients wherein K is a positive integer and (k<K);

a variable length encoder coupled to said selector for converting said selected k quantized orthogonal transformed coefficients into a set of variable length codes; and a multiplexer coupled to said variable length decoder and said variable length encoder for merging the variable length codes of said selected k quantized orthogonal transformed coefficients into said side information, such that said selected k quantized coefficients replacing corresponding blocks in the video data stream.

2. An apparatus according to claim 1, wherein said selected k quantized orthogonal transformed coefficients include a DC component (frequency=0) and (k−1) low frequency components concentrated near said DC component.

3. An apparatus for recording an encoded video data stream which includes a plurality of blocks each containing K quantized orthogonal transformed coefficients, wherein K is a positive integer, comprising:

an input device for feeding in the video data stream;

a storage device coupled to said input device during a normal recording mode for recording the video data stream on a digital storage medium;

a variable length decoder coupled to said input device during a long recording mode for parsing the video data stream, distinguishing and extracting the quantized orthogonal transformed coefficients from other side information;

a selector coupled to said variable length decoder for extracting, for each said block, k quantized orthogonal transformed coefficients wherein K is a positive integer and (k<K);

a variable length encoder coupled to said selector for converting said selected k quantized orthogonal transformed coefficients into a set of variable length codes; and a multiplexer coupled to said variable length decoder and said variable length encoder for merging the variable length codes of said selected k quantized orthogonal transformed coefficients into said side information, such that said selected k quantized coefficients replacing corresponding blocks in the video data stream, and for outputting a new video data stream to said storage means and for recording said new video data stream on said digital storage medium during said long recording mode.

4. An apparatus according to claim 3, wherein said selected k quantized orthogonal transformed coefficients include a DC component (frequency=0) and (k−1) low-frequency components concentrated near said DC component.

* * * * *